Figure 1:
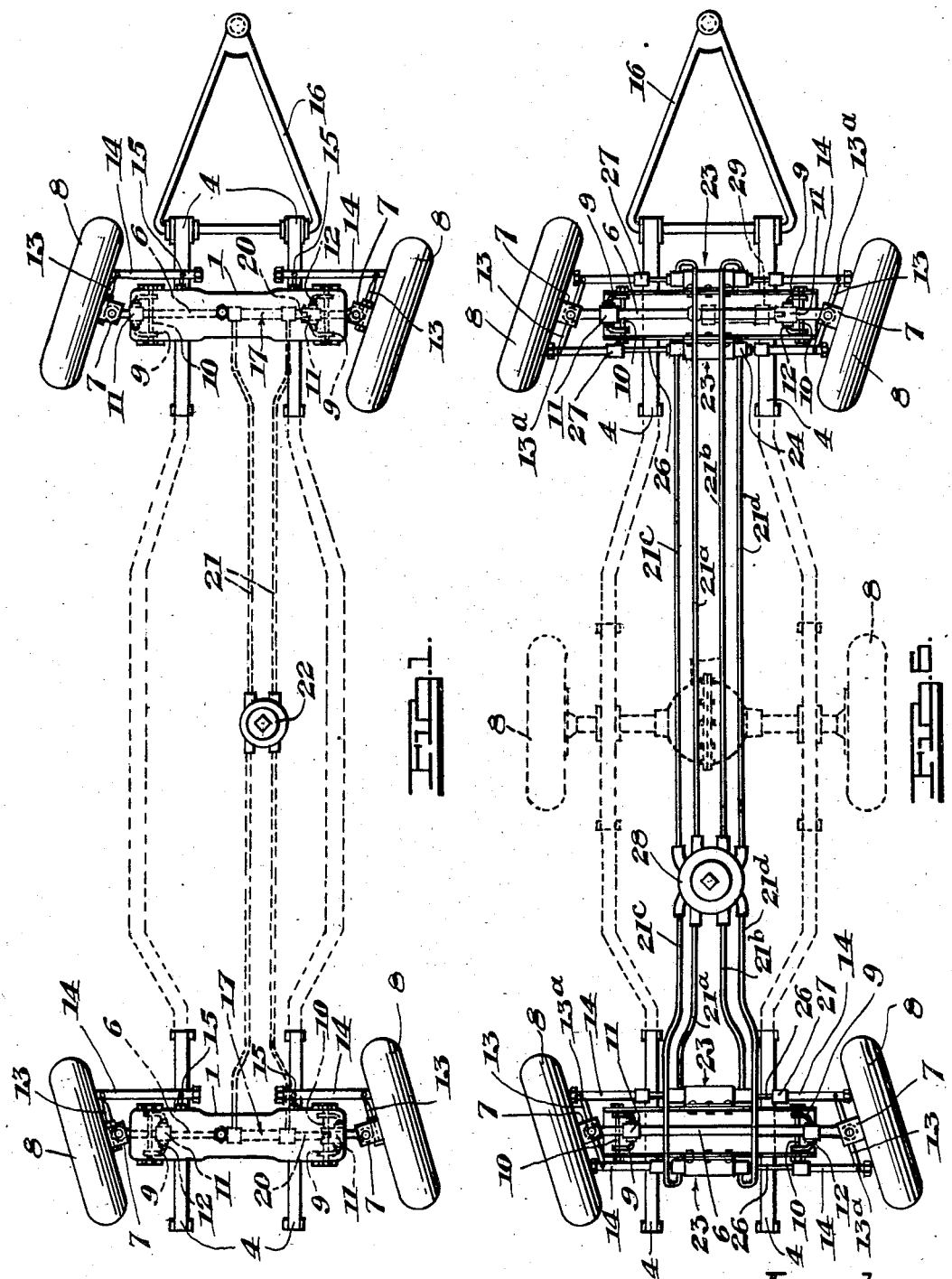

Sept. 28, 1943.  R. COLLIS  2,330,557
VEHICLE SUSPENSION AND STEERING MECHANISM
Filed Sept. 21, 1942  3 Sheets-Sheet 1

Inventor
REGINALD COLLIS

BY *Fetherstonhaugh & Co.*
Attys.

Sept. 28, 1943. R. COLLIS 2,330,557
VEHICLE SUSPENSION AND STEERING MECHANISM
Filed Sept. 21, 1942 3 Sheets-Sheet 2

Inventor
Reginald Collis
By Fetherstonhaugh & Co.
Attys.

Patented Sept. 28, 1943

2,330,557

UNITED STATES PATENT OFFICE 2,330,557

VEHICLE SUSPENSION AND STEERING MECHANISM

Reginald Collis, Ottawa, Ontario, Canada

Application September 21, 1942, Serial No. 459,142

19 Claims. (Cl. 280—33.55)

This invention relates to suspension and steering mechanism for vehicles and more specifically to the provision of controlled steering in both forward and backward directions of motion. It has been developed to provide such controlled steering in a four-wheel trailer but it may equally well be used to provide such controlled steering in a six-wheeled trailer or a six-wheeled tractor. The suspension and steering mechanism may also be used to advantage in place of the conventional suspension and steering mechanism in an automobile or other vehicle.

The invention is in general directed to the immediate objective of providing a vehicle particularly adapted to meet current commercial demands. The normal semi-trailer has three important disadvantages. The trailer cannot be detached and operated independently of the tractor without providing auxiliary front wheels and jacks; the function of the prime mover is restricted to that of a tractor because the front end of the trailer overhangs the rear end of the tractor to such an extent that no space is available on the tractor for carrying weight; the loading platform at the front end of the trailer must be higher than the frame of the tractor vehicle. While the conventional four-wheel trailer overcomes the first two of these disadvantages, it has further disadvantages which are so important that the current trend is to use the two-wheel or semi-trailer.

In the conventional four-wheel trailer the front or steering wheels are mounted on a common axle which in turn is connected to a turntable through the medium of shock-absorbing springs. This assembly is attached to the trailer by means of a central pin or pivot which forms the turning axis of the turntable. A two-bar is secured to the lower turntable assembly at right angles to the front axle and is coupled at its outer extremity to the tractor vehicle. This construction allows the tow-bar to swing to either side so as to pivot the front axle in relation to the frame. The result is that the tow-bar is unstable in compression and lateral stability of the trailer decreases during a turn. Because the tow-bar is unstable in compression controlled steering in the backward direction of motion is impracticable and similarly a heavily loaded trailer on a down grade may dangerously override the tractor vehicle. Lateral stability is decreased during a turn because the effective wheel track decreases in proportion to the horizontal angular movement of the front axle relative to the longitudinal axis of the trailer.

An object of the present invention is, therefore, to provide a multi-axle trailer which eliminates the conventional turntable assembly, provides stability of the tow-bar in compression, maintains lateral stability of the trailer on turns and which has a low centre of gravity.

A more specific object of the invention is to provide in a four-wheel trailer, controlled steering in forward and backward directions of motion on the front axle only in conjunction with a conventional type of back axle.

A further specific object of the invention is to provide in a four-wheel or a six-wheel trailer, or a six-wheel tractor, synchronized controlled steering of both front and rear axles in forward and backward directions of motion.

A further specific object of the invention is to provide in a four-wheel or six-wheel trailer, or a six-wheel tractor, synchronized controlled steering of either front or rear axle or both front and rear axles in both forward and backward directions of motion such that the trailer may be towed from either end, or in the case of the tractor either end may be the front.

A further object of the invention is to provide a novel suspension and steering assembly for an automobile or other vehicle in which steering is effected by lateral movement of the vehicle in relation to the axle.

Various other objects and features of the invention will be apparent from a consideration of the specification and claims taken in conjunction with the accompanying drawings.

In general terms the preferred form of the invention may be said to include in a multi-axle vehicle a suspension and steering mechanism at at least one end of the vehicle comprising an axle connected to the vehicle below the axis of the road wheels, a stub-axle swingably mounted at each end thereof and tie-rod means in front of said axle in relation to the direction of motion pivotally connected to steering arms on each stub axle, the tie-rod means being fixed to move laterally with the vehicle and the axle being mounted to move laterally in relation to the vehicle and means for moving said end of the vehicle laterally in a horizontal plane whereby said lateral movement of the end of the vehicle causes the wheels to be steered to the same side. In the modification in which the vehicle is a trailer the means for moving the end of the vehicle laterally comprises a tow-bar adapted to be moved by a tractor only in a vertical plane in relation to the vehicle. By this it is meant that any movement of the coupling point of the tow-bar in a horizontal plane, and particularly lateral movement, is transmitted directly to the vehicle body or frame. When the multi-axle vehicle is a six-wheel tractor (that is a tractor having road wheels at or near each end of the vehicle and also at a point substantially half-way between the two ends) the means for moving one end of the vehicle laterally comprises a power jack (mechanical, pneumatic or hydraulic) at that end of the vehicle mounted to effect and control relative lateral movement of the axle and the vehicle body or frame. By means of such a jack the wheels at that end are steered to the desired side, the vehicle is pivoted about the central or middle wheels and the opposite end of the vehicle moving to the opposite side steers the wheels at that end likewise to the opposite side. When the multi-axle vehicle is the conventional automobile with axles front and rear, with the suspension and steering mechanism provided at the front, a similar power-jack is provided at the front axle to effect relative lateral movement of vehicle and axle.

Figure 2:
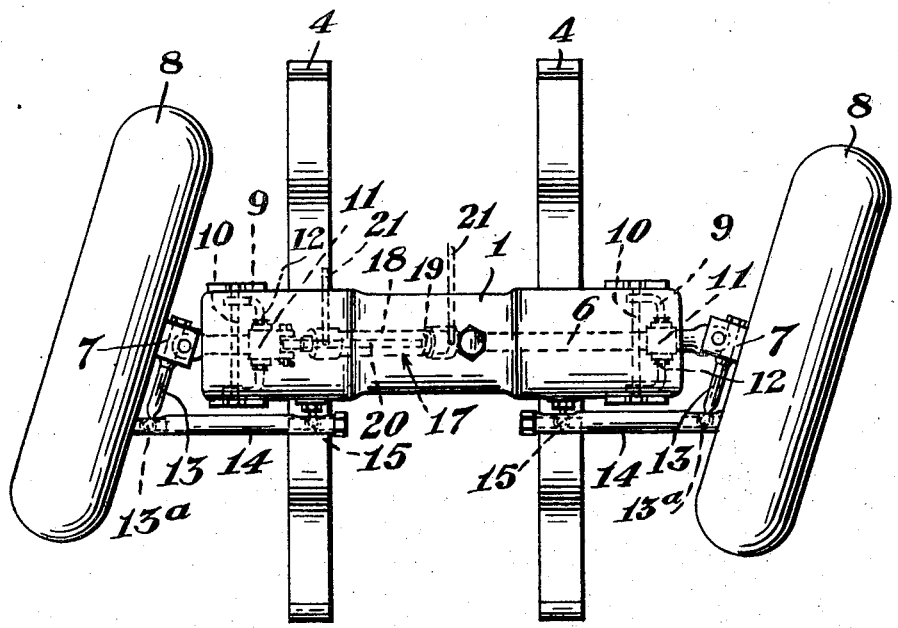
Figure 3:
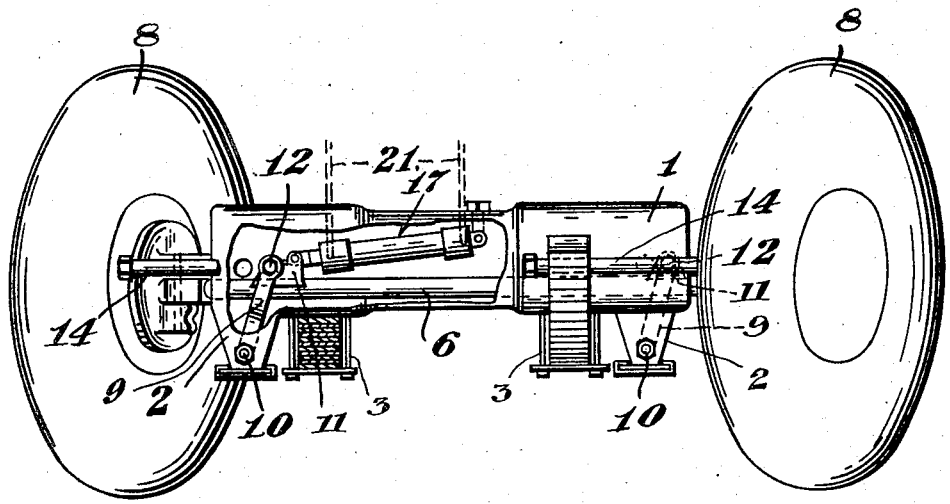
Figure 4:
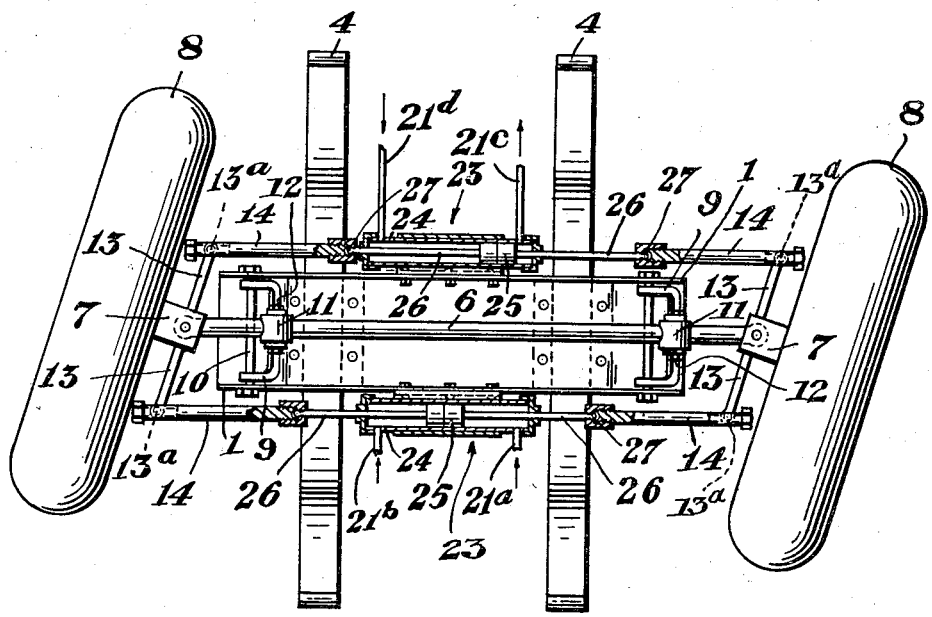
Figure 5:
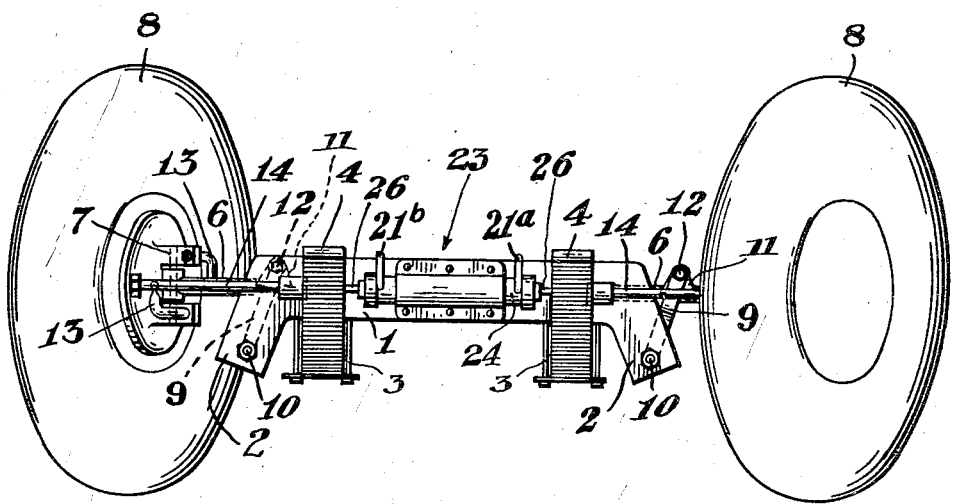

In the drawings,

Figure 1 is a plan view of a four wheel trailer according to the invention using tie-rods at only one side of the axle, Figures 2 and 3 show in detail, in plan and in elevation respectively, the modification in which the tie-rods are provided on only one side of the axle, Figures 4 and 5 show in detail, in plan and in elevation respectively, the modification in which the tie-rods are provided on both sides of the axle, and Figure 6 is a plan view of a vehicle having at each end the suspension and steering mechanism shown in detail in Figures 4 and 5, a third axle half way along the length of the vehicle with a motive power connection being shown in dotted lines.

Referring to Figures 1, 2 and 3 the secondary axle member 1, shown here as a tubular housing with downwardly projecting portions 2, is connected in the usual manner by bolts 3 to springs 4 which in turn are shackled to the frame (or directly to the body of the vehicle according to the type of construction used). Axle 6 is provided at each end with stub-axles 7 on which are mounted road wheels 8. The secondary axle and thus the vehicle are suspended from the axle 6 at points below the axis of the road wheels 8 by means of links 9 connected at their lower extremities to the downwardly projecting portions 2 of the secondary axle 1 by pins 10 on which they are free to turn and at their upper extremities to the axle 6 through lugs 11 by means of pins 12. Steering arms 13 are connected by the usual universal joints 13a to tie-rods 14 similarly connected to the secondary axle member 1 at 15. The links 9 are always substantially parallel, and, the vehicle being underslung, the weight of the vehicle keeps the links in tension and therefore normally upright. Referring to Figure 1 it will be seen that if the front of the vehicle is moved laterally by the tow-bar 16, which is adapted to move in relation to the vehicle only in a vertical plane, then the secondary axle member 1 is moved laterally in relation to and parallel with the axle 6. It is stated that the tow-bar is adapted to move in relation to the vehicle only in a vertical plane and the function of the tow-bar will be understood by taking an example in which it is a link in the form of an isosceles triangle with its base hinged horizontally to the front end of the trailer chassis and with its apex coupled to the tractor by a universal joint. The arc described by the coupling in operation can only be in the vertical plane of the longitudinal axis of the trailer so that lateral movement of the tow-bar is eliminated. Consequently side movement of the tractor is communicated directly to the front portion of the trailer causing it to move laterally in relation to and parallel to the axle at that end by the pendulum action of the two links 9. Since the tie-rods 14 are connected to move with the secondary axle member, and the coefficient of friction between the road and the tires in a lateral direction is considerably greater than the pivoting resistance at their point of contact with the road, the wheels are turned. Because the tie-rods 14 are placed in front of the secondary axle member 1 in relation to the direction of motion, the wheels will turn toward the same side as the tractor.

The suspension and steering mechanism according to the invention may be used only at the front of a four wheel trailer or alternatively it may be provided at both ends as shown in Figure 1. When the assembly is provided at the rear as well as the front it is desirable that when the front wheels are steered to one side the rear wheels should steer to the opposite side to the same degree and in synchronism therewith so that they will track the front wheels. If the tractor vehicle is turned to the right then the front of the trailer is moved over to the right so that the front wheels steer to the right. Centrifugal force, however, at high speed, moves the rear of the trailer to the left, thus tending automatically to steer the rear wheels to the left but it is not satisfactory to leave the rear wheels without definite control based on the action of the front wheels. Thus there may be provided a connection between the front and rear axles such for example as shown in Figures 1 and 2 comprising jacks 17 which may be mechanical or pneumatic but are preferably hydraulic as shown in Figure 2 with cylinder 18, double-headed piston 19, piston rod 20 and fluid conveying lines 21. If then the piston rod 20 is secured to the axle 6 at lug 11 and the cylinder 18 is connected to the secondary axle member 1, or vice versa, then as the front of the trailer is moved to one side or the other the piston 19 is caused to move within the cylinder 18 displacing fluid through the fluid conveying lines 21 to the corresponding side of the jack of the rear axle. Fluid thus entering the jack of the rear axle moves the corresponding piston 19 in the opposite direction to that of the front axle causing the rear wheels to steer in the opposite direction to the front wheels. The displacement of fluid in one jack is of course duplicated in the other and the turning angles of the wheels front and rear will always be synchronized. Means such as selector valve 22 may then be provided for locking the axles in any given position in relation to the secondary axle member so that for example after the wheels have been turned they may be locked and the trailer backed up. At high speeds, the rear axle will preferably be locked in relation to the frame. In practice a header tank and relief valve box will be provided.

According to the preferred modification of the invention tie-rods are provided on both sides of the secondary axle member (see Figures 4 and 5) and means are provided for fixing any tie-rod for movement with the secondary axle, or for allowing it to move laterally in relation to the secondary axle member. As has been seen, when the vehicle moves laterally, the wheels will steer to the same side if the tie-rods in front of the axle in relation to the direction of motion are forced to move with the vehicle in relation to the axle. Thus either side of the axle may become the front in relation to the direction of motion in the double tie-rod construction shown in Figures 4-6, by fixing the tie-rods on that side. If then the vehicle has been moved in one direction, it may be moved in the opposite direction while maintaining a turning angle of the wheels dependent on lateral movement of the coupling point of the tow-bar by changing the side of the axle at which the tie-rods are fixed in relation to the frame. The direction of motion is changed, the front is changed, the tie-rods are fixed at the new front, and the trailer steers at both axles or one axle as desired. These conditions apply whether the trailer is to be pushed in the new direction, as in backing up of the tractor, or is to be pulled in the new direction, as when the tow-bar is moved to the other end of the trailer—the new front end. For convenience, and in order to avoid confusion, the terms "front" and "rear" are used in the claims to describe the ends of the vehicle concerned and the sides of the axles. In all cases the modifying words "in relation to the direction of motion" are to be understood as included whether expressed or not.

In Figures 4-6 the means for fixing the tie-rods in relation to the frame comprises jacks 23 which may be mechanical or pneumatic but are preferably hydraulic, as shown in Figure 4, comprising cylinder 24, double-headed piston 25 and piston rods 26. The cylinders 24 are rigidly connected to the secondary axle member 1 and the piston rods 26 are coupled through universal joints 27 to tie-rods 14 so that the tie-rods may be fixed in relation to the secondary axle (or frame) by restraining the piston connected thereto within the cylinder. This may conveniently be done by preventing the flow of fluid in fluid conveying lines marked 21a and 21b in Figures 4 and 6, or alternatively by mechanical means. Relative lateral movement of the secondary axle member 1 and the axle 6 then turns the wheels and moves the rear tie-rods and their piston thus displacing fluid within the rear cylinder. The rear jack in relation to the direction of motion thus takes the place of the jack 17 shown in Figures 1-3. Fluid conveying lines 21c and 21d are connected to convey fluid to the same side of the corresponding jack of the other axle. The connection of the fluid conveying lines 21 will be seen by referring to the four wheel trailer with double tie-rods illustrated in full lines in Figure 6. The direction of motion is towards the tow-bar 16 and the front pistons of each axle are restrained in central position by operating selector valve 28 to prevent flow of fluid in lines 21a and 21b. The turn is to the right so that the vehicle frame and thus the secondary axle member 1, the front piston of the front axle and its tie-rods 14 move to the right and steer the front wheels to the right. At he same time the rear cylinder 24 of the front axle is also moved to the right and its piston 25 is moved to the left so that fluid is displaced from the left side of piston 25 through line 21c to the selector valve 28 which may either return it to the right side of the rear piston 25 of the front axle through the line 21d or convey it to the left side of the rear piston 25 of the rear axle, depending on whether steering of the rear wheels is desired. In the latter case the rear piston 25 of the rear axle is moved to the right thereby steering the rear wheels to the left and fluid from the right side of piston 25 is displaced through lines 21d and valve 28 to the right side of the rear piston 25 of the front axle.

If it is desired to reverse the direction of motion and back up the four wheel trailer having the construction shown in full lines in Figure 6, then the pistons in both axles at the original front are released and the pistons in each axle at the original rear are locked centrally with respect to their respective cylinders. The result is to give controlled steering in the new direction as effective as in the original direction. If, for example, the trailer is stopped in the position shown in Figure 6 and is to track back on the path it has taken, the tractor will push the tow-bar and hence the tow-bar end of the trailer to the left and the wheels will be angled as shown in Figure 6. If, on the other hand, the trailer is to be pushed backwards on a curved path to the other side, the tractor will be positioned to move the coupling point and hence the tow-bar end of the trailer to the right. The "front" in relation to the direction of motion is thus changed so that it is again the "front" pistons which are locked and the "rear" pistons which are allowed lateral movement. Fluid displaced from the "rear" jack of the "rear" axle will actuate the "rear" jack of the "front" axle to steer the "front" wheels. Alternatively the tow-bar may be secured to the other end and then the rear jack of the front axle will again actuate the rear jack of the rear axle.

At high speed it is not desirable to continue steering of the rear axle and means are therefore provided for locking any piston either centrally or in any position with respect to its cylinder. For this purpose a selector valve such as that shown at 28 may conveniently be operated in conjunction with the change speed gear of the tractor. With the tractor vehicle in neutral all four pistons of the jack are restrained, for example by closing all ports of the selector valve to which are led the four fluid conveying lines 21. This is a normal setting when the trailer is stationary and prevents lateral movement of the chassis in relation to the axle. When the tractor is put into reverse the pistons of the rear jacks of the front and rear axles are restrained in the central positions and the pistons of the front jacks of the front and rear axles are allowed lateral movement. When the tractor is put into forward low speed the pistons of the front jacks of the front and rear axles are restrained in the central positions and the pistons of the rear jacks of the front and rear axles are allowed lateral movement. When the tractor is put into high speed, at which it is desired to have steering on the front wheels only, the pistons both front and rear of the rear axle are locked in the central position. So also is the piston of the front jack of the front axle, while the piston of the rear jack of the front axle is allowed lateral movement.

Since the turning axis of the road wheels of the front and rear axles converge on a line at right angles to and mid-way along the longitudinal axis of the chassis a third axle, as shown in dotted lines in Figure 6, can be provided and positioned mid-way between the front and rear axles without interfering with the steering characteristics. Where such a middle axis is provided it is not essential to provide a fluid connection between front and rear axles so that fluid displaced from the front axle will displace the appropriate piston in the rear axle and steer the rear wheels. Movement of one end of the vehicle laterally will cause the vehicle to pivot around the central axle and the other end of the vehicle to move laterally in the opposite direction thus producing automatically the desired opposite steering provided always, of course, that in relation to the direction of motion the front piston in each axle is restrained in the central position. All that is essential then is that means be provided for locking any given piston.

Motive power may be applied to the central axle through a differential shown in dotted lines in Figure 6 and in that case there will be no tow-bar. The same conditions as described above with respect to the six-wheel trailer apply as to fluid connections between the jacks of the two end axles. In either case it will, of course, be necessary to provide for fluid connection and control between the two sides of each piston and any piston can be locked by blocking such connection. In the six-wheel trailer or in the six-wheel prime mover shown in Figure 6 steering is initiated by a lateral movement of one end of the vehicle. In the case of the trailer this is effected by the tow-bar and in the case of the prime mover this is effected by a power jack 29 which is mounted to force a relative lateral movement between the axle 6 and the secondary axle member 1. Lateral movement of the end of the vehicle concerned is thus produced, the vehicle is pivoted around the middle axle and automatic steering of the other end of the vehicle is produced. It is only necessary for steering of the vehicle in either direction that a power jack be provided at one end of the vehicle, but if desired a second power jack may be provided at the other end so that steering will be initiated at the end which is for the time being considered as the front.

An automobile having the suspension and steering mechanism according to the invention at the front axle and a power jack 29 for effecting relative lateral movement of the frame and the axle 6 is represented in Figure 6 by the front and middle axles without tow-bar 16.

If desired, the frame of the six-wheel trailer or six-wheel prime mover shown in Figure 6 may be articulated laterally over the middle axle so that the vehicle may negotiate uneven ground.

What I claim as my invention is:

1. A suspension and steering mechanism for a vehicle, comprising an axle, means in connection with said axle adapted to carry the weight of said vehicle below the axis of the road wheels and permit relative lateral movement of the axle and the vehicle in a horizontal plane, a stub axle for a road wheel swingably connected at each end of said axle, and tie rod means coupled to steering arms on said stub axles, the tie rod means being fixed to move laterally with said vehicle in relation to said axle.

2. A suspension and steering mechanism for a vehicle, comprising an axle, means in connection with said axle adapted to carry the weight of said vehicle below the axis of the road wheels and permit relative lateral movement of the axle and the vehicle in a horizontal plane, a stub axle for a road wheel swingably connected at each end of said axle, and tie rod means comprising a set of tie rods coupled to steering arms on each stub axle on each side of the axle, and means for fixing each set of tie rods to move laterally with said vehicle in relation to said axle.

3. A suspension and steering mechanism as defined in claim 1 in which said means in connection with said axle comprise, at each side of the vehicle, a link member connected at the bottom to a part of the vehicle which is below the axis of the road wheels, and at the top to the axle, each end of each link member being mounted to swing longitudinally of the axle, for relative lateral movement of the axle and the vehicle.

4. In a trailer having wheels front and rear, a tow bar secured to said trailer for movement in relation thereto only in a vertical plane and a suspension and steering assembly comprising an axle mounted to move laterally in relation to the trailer, a stub axle swingably mounted at each end of said axle, and tie rod means in front of said axle pivotally connected to steering arms on said stub axles, the tie rod means being fixed to move laterally with the trailer whereby lateral movement of the trailer causes the wheels to be steered to the same side.

5. In a trailer having wheels front and rear, a tow bar adapted to move the front portion of the trailer laterally in a horizontal plane in unison with the coupling of the tow bar, and a suspension and steering assembly comprising an axle connected to the trailer below the axis of the road wheels, a stub axle swingably connected at each end of the axle, and tie rod means in front of said axle pivotally connected to steering arms on said stub axles, the tie rod means being fixed to move laterally with the trailer and the axle being mounted to move laterally in relation to the trailer whereby lateral movement of the trailer causes the wheels to be steered to the same side.

6. An arrangement as defined in claim 5 in which means are provided for locking the tie rod means and the axle against relative lateral movement whereby when the wheels have been steered to one side and the direction of motion is to be reversed they may be retained so turned.

7. In a trailer having a frame and a front and rear axle, a tow bar secured to said frame for movement in relation thereto only in a vertical plane, a front axle assembly comprising an axle movable laterally in a horizontal plane with respect to said frame, a stub axle swingably connected to each end of said axle, means connecting said axle to said frame below the axis of the road wheels for said relative lateral movement of the axle and the frame, tie rod means in front of said axle connected to move laterally with said frame, and steering arms connected to each stub axle, the tie rod means being pivotally connected to each such steering arm.

8. An arrangement as defined in claim 7 in which the means connecting the axle to the frame comprise a secondary axle member connected to the frame for unitary movement therewith in a horizontal plane and having near each end a portion which is lower than the axis of the road wheels, a link member hingedly connected at the bottom to each such portion and at the top to the axle to swing longitudinally of the axle, the two link members being always substantially parallel and the tie rod means being connected to said secondary axle member for movement therewith.

9. A trailer having a frame and a front and rear axle, a tow bar secured to said frame for movement in relation thereto only in a vertical plane whereby lateral movements of its coupling point are imparted directly to said frame, a front and rear axle assembly each comprising an axle movable laterally in a horizontal plane with respect to said frame, a stub axle swingably connected to each end of said axle, means connecting said axle to said frame below the axis of the road wheels for said relative lateral movement of the axle and the frame, a steering arm in connection with each stub axle, tie rod means in front of said axle pivotally connected to each such steering arm and connected to move laterally with said frame and jack means having one component connected to move with the axle, and the other connected to move with the frame, corresponding sides of the jack means for the front axle and of the jack means for the rear axle being coupled so that when the front of the vehicle is moved to one side the front wheels will steer to that side and the rear wheels will steer to the other side.

10. An arrangment as defined in claim 9 in which means are provided for locking the tie rod means and the axle at both ends of the vehicle against relative lateral movement whereby when the wheels have been steered to one side and the direction of motion is to be reversed, they may be retained so turned.

11. An arrangment as defined in claim 9 in which the means connecting the axle to the frame comprise a secondary axle member connected to the frame for movement therewith in a horizontal plane and having near each end a portion which is lower than the axis of the road wheels, a link member hingedly connected at the bottom to each such portion and at the top to the axle to swing longitudinally of the axle, the two links being always substantially parallel and the tie rod means being connected to said secondary axle member for movement therewith.

12. In a trailer having a frame and a front and rear axle, a tow bar secured to said frame for movement in relation thereto only in a vertical plane whereby lateral movements of its coupling point are imparted directly to said frame, a front and rear axle assembly each comprising an axle movable laterally in a horizontal plane with respect to said frame, a stub axle swingably connected to each end of the said axle, means connecting said axle to said frame at points below the axis of the road wheels for said relative lateral movement of the axle and the frame, a steering arm in connection with each stub axle, tie rod means in front of each axle and tie rod means in rear of each axle connected respectively to the steering arms, means for fixing any of said tie rod means against lateral movement in relation to the frame, and fluid jack means having one component connected to move with the axle, and the other connected to move with the frame, corresponding sides of the jack means for the front axle and of the jack means for the rear axle being coupled so that when the front of the vehicle in relation to the direction of motion is moved to one side the front wheels will steer to that side and the rear wheels will steer to the other side.

13. An arrangement as defined in claim 12 in which said jack means comprise front and rear of each axle, a hydraulic cylinder, a double ended piston and means conveying fluid to and from each side of said piston, the piston being connected to move with the tie rod means and the cylinder being fixed with respect to the trailer frame, and in which, in relation to the direction of motion, the front tie rod means in each axle is fixed against relative lateral movement by locking the associated piston relatively to its cylinder, and the rear piston in each axle is permitted to move relatively to its cylinder, the relative lateral movement of the axle and the frame moving the rear piston of the front axle to displace fluid to the rear cylinder of the rear axle to move the piston thereof, to steer the rear wheels of the trailer.

14. An arrangement as defined in claim 12 in which the means for fixing the tie rod means against lateral movement comprises a selector valve adapted to lock all tie rods, or both the tie rods of one axle and in relation to the direction of motion, the front tie rod of the other axle, or the front tie rod of both axles.

15. In a trailer having a frame and a front and rear axle, a tow bar secured to said frame for movement in relation thereto only in a vertical plane whereby lateral movements of its coupling point are imparted directly to said frame, a front and a rear axle assembly each comprising an axle movable laterally in a horizontal plane with respect to said frame, a stub axle swingably connected to each end of said axle, a secondary axle member connected to the frame for movement therewith in a horizontal plane having near each end a portion which is lower than the level of the axis of the road wheels, a link member hingedly connected at the bottom to each such portion and at the top to the axle to swing longitudinally of the axle, the two links being always substantially parallel, a hydraulic jack on each side of said secondary axle member comprising a cylinder secured to said member, a double ended piston, and means for conveying fluid to and from either side of said piston, a tie rod pivotally connecting each end of said piston to the adjacent steering arm, means connecting corresponding sides of the front jack of the front axle and the front jack of the rear axle, means connecting corresponding sides of the rear jack of the front axle with the rear jack of the rear axle, and selector means permitting the locking of any jack for movement of the tie rods connected therewith as a unit with the secondary axle concerned.

16. A multi-axle vehicle comprising, at at least one end of the vehicle, a suspension and steering assembly comprising an axle connected to the vehicle below the axis of the road wheels, a stub axle swingably mounted at each end thereof and tie rod means in front of said axle pivotally connected to steering arms on each said stub axle, the tie rod means being fixed to move laterally with the vehicle and the axle being mounted to move laterally in relation to the vehicle and means for moving said end of the vehicle laterally in a horizontal plane whereby said lateral movement of the end of the vehicle causes the wheels to be steered to the same side.

17. A vehicle as defined in claim 16 in which said means for moving said end of the vehicle laterally comprise a tow bar adapted to be moved by a tractor only in a vertical plane in relation to said vehicle.

18. A multi-axle vehicle comprising a conventional axle with road wheels disposed substantially at the middle of the length of the vehicle, at each end of the vehicle a suspension and steering assembly comprising an axle connected to the vehicle below the axis of the road wheels, a stub axle swingably connected at each end of said axle and tie rod means in front of said axle pivotally connected to steering arms on each said stub axle, the tie rod means being fixed to move laterally with the vehicle and the axle being mounted to move laterally in relation to the vehicle whereby lateral movement of one end of the vehicle causes the wheels at that end to be steered to the same side, motive power transmitted to the road wheels of said centrally disposed axle and means comprising a power jack for moving the front end of said vehicle laterally.

19. A multi-axle vehicle comprising a conventional axle with road wheels disposed substantially at the middle of the length of the vehicle, at each end of the vehicle a wheel suspension and steering assembly comprising an axle connected to the vehicle at points below the axis of the road wheels, a stub axle swingably connected at each end of the latter axle, and tie rod means front and rear of this axle pivotally connected to steering arms on each said stub axle, the tie rod means being fixable for movement laterally with the vehicle, and the axle of the said assembly being mounted to move laterally in relation to the vehicle whereby when the front tie rod means in relation to the direction of motion is fixed in each such axle, and one end of the vehicle is moved laterally, the wheels at that end are steered to the same side, the vehicle is pivoted about the central wheels and the other end is moved laterally in the opposite direction to steer the wheels at that end to the opposite side, motive power transmitted to the road wheels of said centrally disposed axle, and means comprising a power jack for effecting relative lateral movement of axle and vehicle for moving either end of said vehicle laterally.

REGINALD COLLIS.